(12) United States Patent
Metz et al.

(10) Patent No.: US 10,498,743 B2
(45) Date of Patent: Dec. 3, 2019

(54) SYSTEMS AND METHODS FOR DATA AUTHENTICATION VIA A STATELESS EDGE APPLIANCE

(71) Applicant: Walmart Apollo, LLC, Bentonville, AR (US)

(72) Inventors: John Metz, Bentonville, AR (US); David Keith Taylor, Bentonville, AR (US); Marina Hodges, Springdale, AR (US)

(73) Assignee: Walmart Apollo, LLC, Bentonville, AK (US)

( * ) Notice: Subject to any disclaimer, the term of this patent is extended or adjusted under 35 U.S.C. 154(b) by 95 days.

(21) Appl. No.: 15/380,698

(22) Filed: Dec. 15, 2016

(65) Prior Publication Data

US 2017/0195341 A1    Jul. 6, 2017

Related U.S. Application Data

(60) Provisional application No. 62/273,720, filed on Dec. 31, 2015.

(51) Int. Cl.
| | |
|---|---|
| *H04L 29/06* | (2006.01) |
| *G06Q 20/10* | (2012.01) |
| *G06Q 20/20* | (2012.01) |
| *G06Q 20/40* | (2012.01) |

(52) U.S. Cl.
CPC ....... *H04L 63/123* (2013.01); *G06Q 20/1085* (2013.01); *G06Q 20/202* (2013.01); *G06Q 20/4014* (2013.01); *H04L 63/0464* (2013.01); *H04L 63/08* (2013.01); *G06Q 2220/00* (2013.01); *H04L 63/0428* (2013.01)

(58) Field of Classification Search
CPC ...................................... H04L 63/123
See application file for complete search history.

(56) References Cited

U.S. PATENT DOCUMENTS

| | | | |
|---|---|---|---|
| 7,240,843 | B2 | 7/2007 | Paul et al. |
| 7,392,388 | B2 | 6/2008 | Keech |
| 2007/0288313 | A1 | 12/2007 | Brodson et al. |
| 2008/0223918 | A1 | 9/2008 | Williams et al. |
| 2011/0231272 | A1 | 9/2011 | Englund et al. |

(Continued)

FOREIGN PATENT DOCUMENTS

WO    2012143547 A1    10/2012

*Primary Examiner* — Noura Zoubair
(74) *Attorney, Agent, or Firm* — McCarter & English, LLP; David R. Burns

(57) ABSTRACT

Methods, systems, and non-transitory computer readable media are provided for rendering at an electronic terminal a first set of graphical user interfaces to request a first set of data from a user, receiving, at a central server in communication with the electronic terminal, the first set of data from the user, communicating the first set of data via a stateless edge appliance to a third party verification server in a selected one of a plurality of third party computer networks to validate the first set of data, rendering a second set of graphical user interfaces to request a second set of data from the user, communicating the second set of data to the third party verification server to authenticate the second set of data, and authenticating the user in response to receipt of authentication of the second set of data.

13 Claims, 5 Drawing Sheets

(56) References Cited

U.S. PATENT DOCUMENTS

| | | | | |
|---|---|---|---|---|
| 2013/0275308 A1* | 10/2013 | Paraskeva | ............... | G06Q 20/32 |
| | | | | 705/71 |
| 2014/0019352 A1* | 1/2014 | Shrivastava | ........ | G06Q 20/3674 |
| | | | | 705/41 |
| 2014/0156512 A1* | 6/2014 | Rahman | ................. | G06Q 20/10 |
| | | | | 705/39 |
| 2014/0201084 A1* | 7/2014 | Dagenais | ............... | G06Q 20/40 |
| | | | | 705/64 |

* cited by examiner

SYSTEMS AND METHODS FOR DATA AUTHENTICATION VIA A STATELESS EDGE APPLIANCE

CROSS-REFERENCE TO RELATED PATENT APPLICATIONS

This application claims priority to U.S. Provisional Application No. 62/273,720 filed on Dec. 31, 2015, the contents of the application is hereby incorporated by reference in its entirety.

BACKGROUND

Conventionally, transmission and authentication of encrypted data communicated between systems requires application of the same encryption standard by each of the systems to allow encryption and decryption of the data.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

As discussed above, authentication of encrypted data communicated between systems requires application of the same encryption standard by each of the systems to allow encryption and decryption of the data. Therefore, conventionally, systems intended for encrypted communication with a plurality of other systems must be pre-configured to apply and recognize each and every encryption standard used by the plurality of other systems.

Methods, systems, and non-transitory computer readable media are provided herein for data authentication via a stateless edge appliance. The methods, systems, and non-transitory computer readable media, in accordance with various embodiments, are configured to render, by a display device of an electronic terminal, a first set of graphical user interfaces of a web service associated with one or more universal resource locators hosted by a central server in communication with the electronic terminal to request a first set of data from a user. In accordance with various embodiments, the electronic terminal and the central server form a first computer network. The methods, systems, and non-transitory computer readable media, in accordance with various embodiments, are also configured to receive, at the central server via a user input of the electronic terminal, the first set of data from the user. The methods, systems, and non-transitory computer readable media, in accordance with various embodiments, are also configured to communicate, by the first computer network and via a stateless edge appliance, the first set of data to a third party verification server in a selected one of a plurality of third party computer networks to validate the first set of data, the selected one of the third party computer networks being selected based on the first set of data. The methods, systems, and non-transitory computer readable media, in accordance with various embodiments, are also configured to render, by the electronic terminal, in response to receipt of validation of the first set of data from the third party verification server by the central server, a second set of graphical user interfaces of the web service associated with the one or more universal resource locators hosted by the central server to request a second set of data from the user. The methods, systems, and non-transitory computer readable media, in accordance with various embodiments, are also configured to communicate, by the first computer network and via the stateless edge appliance, the second set of data to the third party verification server in the selected one of the third party computer networks to authenticate the second set of data. The methods, systems, and non-transitory computer readable media, in accordance with various embodiments, are also configured to authenticate the user in response to receipt of authentication of the second set of data from the third party verification server by the central server.

Figure 1:
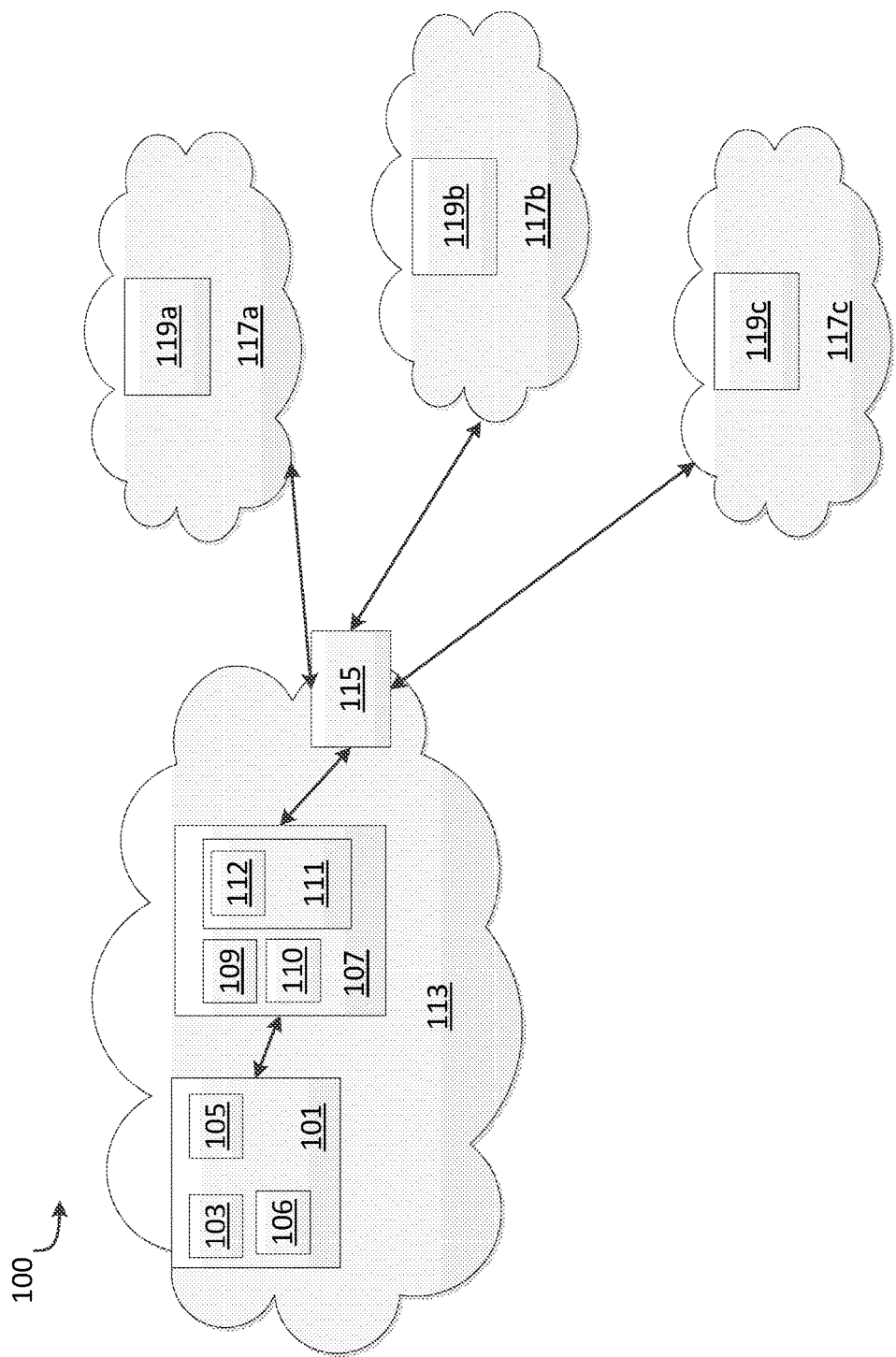
FIG. 1 is a block diagram illustrating a system for authentication of encrypted data in accordance with various embodiments taught herein.
Figure 2:
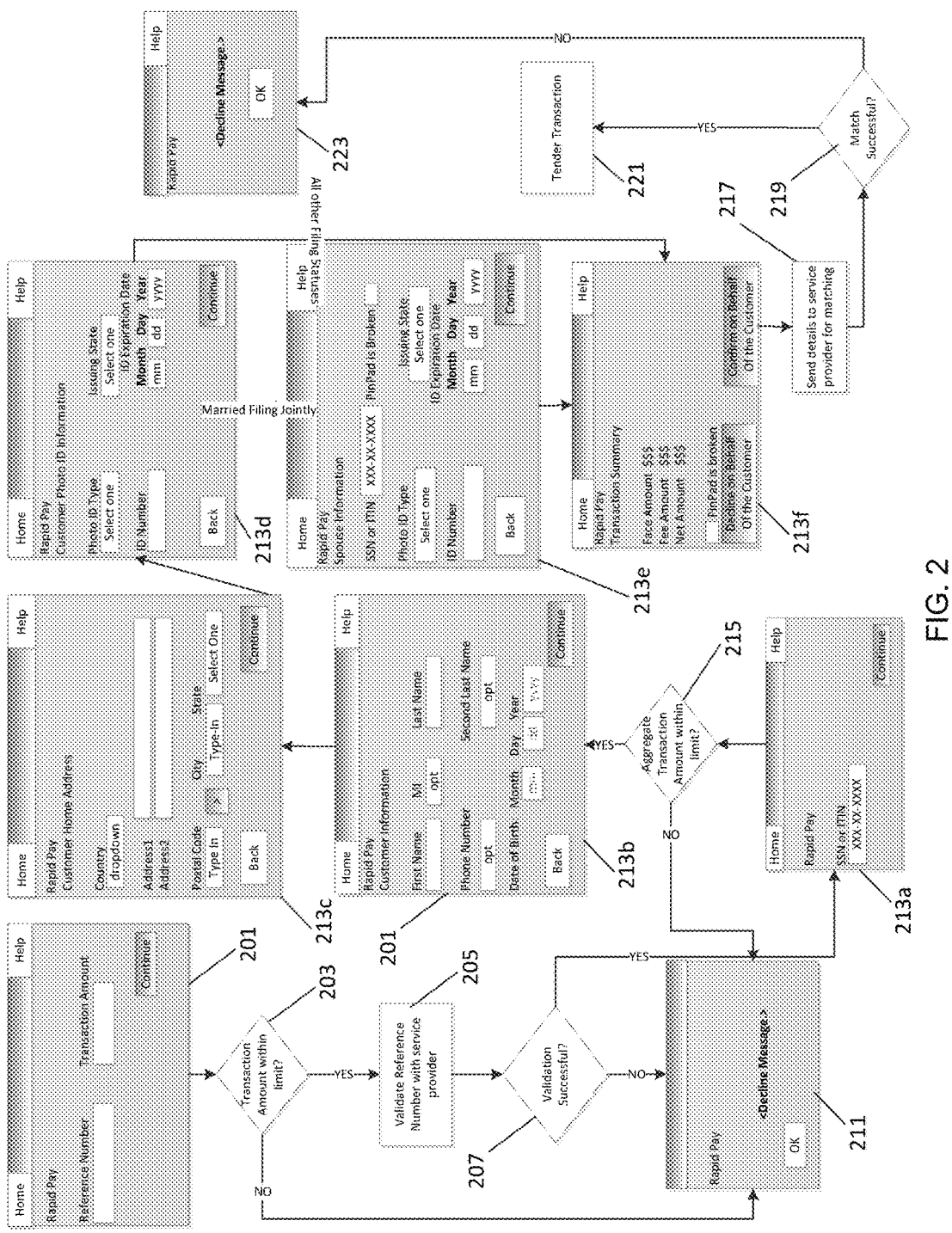
FIG. 2 is a system flow diagram illustrating authentication of encrypted data in accordance with various embodiments taught herein.

Referring now to FIG. 1, an exemplary system 100 for data authentication via a stateless edge appliance includes a first computer network 113 including electronic terminals 101 in communication with a central server 107. In accordance with various embodiments, the electronic terminals 101 can each include a display device 103 configured to render graphical user interfaces of a web service (e.g., as shown in FIG. 2) associated with one or more universal resource locators (URL) 112 hosted in a memory 111 of the central server 107. The electronic terminals 101 also include an input device 105 for receiving information input by users and a terminal communication device 106 for communication via one or more communications networks (e.g., the first computer network 113 or one or more of a plurality of third party networks 117a-c as shown in FIG. 1) with, for example, the central server 107 or one or more of a plurality of third party verification servers 119a-c. The central server 107 includes the memory 111 for hosting the URLs 112, a processor 109 for processing user input information received by the input device 105, and a server communication device 110 for communication via one or more communications networks (e.g., the first computer network 113 or one or more of the plurality of third party networks 117a-c as shown in FIG. 1) with, for example, the electronic terminals 101 or one or more of the plurality of third party verification servers 119a-c.

The system 100 also includes a stateless edge appliance 115 for receiving sets of data (e.g., from the central server 107 or the electronic terminals) in a first format for communication from the first computer network 113, selecting one or more of the third party computer networks 117a-c based on the received data sets, determining compatible data formats for communication with the selected third party networks 117a-c, reformatting/transforming the received data sets from the first format to the compatible data formats, and routing the reformatted data sets to the third party computer networks 117a-c (e.g., for communication to one or more of the third party verification servers 119a-c). The stateless edge appliance 115 can receive data from any one of the third party networks 117a-c in a format specified by the third party network(s), can reformat/transform the data into the format that is compatible with the first computer network, and can route the reformatted/transformed data to the central server 107, which can route the data to one of the electronic terminals 101 based on the content of the data.

Electronic terminals 101, in accordance with various embodiments, can include, for example, but is not limited to, any computational device including a workstation, desktop computer, server, laptop, handheld computer, tablet computer, mobile device, a smartphone, a cellular phone, a satellite phone, a tablet, a personal digital assistant (PDA), a laptop, a wireless barcode scanner, a handheld computing device, a point of sale (POS) terminal, an automated teller machine (ATM), or combinations thereof. The terminal communication device 106 and of the electronic terminals 101 and the server communication device 110 of the central server 107, in accordance with various embodiments can include, for example, but is not limited to, a radio frequency (RF) transceiver, a near-field communication (NFC) device, a Bluetooth® transceiver, a built-in network adapter, a network interface card, a Personal Computer Memory Card International Association (PCMCIA) network card, a card bus network adapter, a wireless network adapter, a USB network adapter, a modem, or any other device suitable for interfacing with any type of network capable of communication and performing the operations described herein.

The input device 105, in accordance with various embodiments, can include, for example, but is not limited to, a keyboard, a computer mouse, a joystick, a trackball, a touchscreen, a voice recognition module, a barcode scanner, an optical scanner, a digital camera, other suitable devices, or combinations thereof. The display device 103, in accordance with various embodiments, can include, for example, but is not limited to, a computer monitor, a television, a touchscreen display, a POS payment station, an ATM display, any other suitable display device, or combinations thereof. The electronic terminals 101, in accordance with various embodiments, can also include one or more software applications for operating the system 100.

Central server 107, in accordance with various embodiments, can include, for example, but are not limited to, any computational device, such as a workstation, desktop computer, server, laptop, handheld computer, tablet computer, mobile device, or other form of computing or telecommunications device that is capable of communication and that has sufficient processor power and memory capacity to store, query, and update URL data. More generally, server, as used herein with reference to any of the various servers described, can include, for example, any computational device, such as a workstation, desktop computer, server, laptop, handheld computer, tablet computer, mobile device, or other form of computing or telecommunications device that is capable of communication and that has sufficient processor power and memory capacity to perform the described function of each server. Processor 109, in accordance with various embodiments can include, for example, but is not limited to, a microchip, a processor, a microprocessor, a special purpose processor, an application specific integrated circuit, a microcontroller, a field programmable gate array, combinations thereof, or any other device that is capable of processing data received by or stored on the central server 107.

Memory 111, in accordance with various embodiments can include, for example, but not limited to, hardware memory, non-transitory tangible media, magnetic storage disks, optical disks, flash drives, computational device memory, random access memory, such as but not limited to DRAM, SRAM, EDO RAM, any other type of memory, or combinations thereof. Memory 111, in accordance with various embodiments, can be configured to store and host one or more URLs 112 having graphical user interfaces of a web service associated therewith for rendering and display by the display device 103 of the electronic terminals 101. URLs 112 can be, in accordance with various embodiments, any suitable URL format, including, for example, HTTP, HTTPS, MAILTO, JDBC, FTP, or any other suitable format. The memory 111 can also, in accordance with various embodiments, include one or more software applications for operating the system 100.

The first computer network 113 and third party networks 117a-c, in accordance with various embodiments, can include, for example, secure networks (e.g., a mobile network, a wi-fi network, a local network, the internet, or a secure network), in accordance with various embodiments, can be, for example, a Wireless Encryption Protocol (WEP) network, a Wireless Protected Access (WPA) network, a WPA2 network, a DMZ network (perimeter network), a wireless access protocol (WAP) network, other encrypted networks, the internet, unsecured networks, cloud networks, or combinations thereof. More generally, the first computer network 113 and third party networks 117a-c can be any computer network capable of communicating encrypted information or data.

Stateless edge appliance 115, in accordance with various embodiments, can include, for example, but is not limited to, any stateless server, receiver, transmitter, router, or processing device capable of receiving sets of data, reformatting the received sets of data, and transmitting the reformatted sets of data. For example, the stateless edge appliance, in accordance with various embodiments, can receive sets of data (e.g., from the central server 107 or the electronic terminal) in a first format for communication from the first computer network 113, selecting one or more of the third party computer networks 117a-c based on the received data sets, determining compatible data formats for communication with the selected third party networks 117a-c, reformatting the received data sets from the first format to the compatible data formats, and routing the reformatted data sets to the third party computer networks 117a-c (e.g., for communication to one or more of the third party verification servers 119a-c).

Third party verification servers 119a-c, in accordance with various embodiments, can include, for example, but are not limited to, any computational device, such as a workstation, desktop computer, server, laptop, handheld computer, tablet computer, mobile device, or other form of computing or telecommunications device that is capable of communication and that has sufficient processor power and memory capacity to store, query, authenticate, and validate data. More generally, server, as used herein with reference to any of the various servers described, can include, for example, any computational device, such as a workstation, desktop computer, server, laptop, handheld computer, tablet computer, mobile device, or other form of computing or telecommunications device that is capable of communication and that has sufficient processor power and memory capacity to perform the described function of each server.

In accordance with various embodiments, users can operate the electronic terminals 101 to commence use of the system 100. For example, a user can operate one of the electronic terminals 101 by providing user input at the input device 105, thereby causing the display device 103 to render a first set of graphical user interfaces of a web service associated with the one or more URLs 112 hosted by the central server 107 in the memory 111. The user can, in accordance with various embodiments, provide, via the input device 105, information requested by one or more fields of the rendered first set of graphical user interfaces displayed by the display 103 to generate a first set of data. The electronic terminal 101 operated by the user can transmit the first set of data to the central server 107 via the terminal communication device 106 for receipt by the server communication device 110.

In response to receiving the first set of data at the central server 107, the system 100 can use the server communication device 110 to transmit the first set of data in a first format to one or more of the third party verification servers 119a-c for validation of the first set of data. In accordance with various embodiments, the first set of data is transmitted by the server communication device 110 via the first computer network 113 to the stateless edge appliance 115 which, in turn, reformats/transforms the first set of data to generate one or more reformatted/transformed first data sets for transmission via one or more of the third party networks 117a-c to one or more of the third party verification servers 119a-c. In accordance with various embodiments, the stateless edge appliance 115, in response to receiving the first set of data, can analyze the received first set of data in the first format, select an intended one or more of the third party networks 117a-c, determine compatible data formats for communication with the selected one or more of the third party networks 117a-c, reformat the received first set of data into the compatible data formats, and route the reformatted first data sets to the third party networks 117a-c.

The third party verification servers 119a-c can, in response to receiving the reformatted first data set, validate the first data set and transmit a validation confirmation to the central server 107. The validation confirmation, in accordance with various embodiments, can be transmitted by the third party verification servers 119a-c in the compatible data formats via the third party networks 117a-c to the stateless edge appliance 115 which, in turn, reformats the validation confirmation to the first format to generate a reformatted validation confirmation for transmission via the first computer network 113 to the central server 107.

The central server 107 can, in response to receiving the reformatted validation confirmation, transmit instructions to one of the electronic terminals 101 (e.g., the electronic terminal from which the first data set is transmitted) to instruct the display 103 to render a second set of graphical user interfaces of the web service associated with the one or more URLs 112 hosted by the central server 107 in the memory 111. The user can, in accordance with various embodiments, provide, via the input device 105, information requested by one or more fields of the rendered second set of graphical user interfaces displayed by the display 103 to generate a second set of data. The electronic terminal 101 operated by the user can transmit the second set of data to the central server 107 via the terminal communication device 106 for receipt by the server communication device 110.

In response to receiving the second set of data at the central server 107, the system 100 can use the server communication device 110 to transmit the second set of data in the first format to one or more of the third party verification servers 119a-c for validation of the first set of data. In accordance with various embodiments, the second set of data is transmitted by the server communication device 110 via the first computer network 113 to the stateless edge appliance 115 which, in turn, reformats/transforms the second set of data to generate one or more reformatted/transformed second data sets for transmission via one or more of the third party networks 117a-c to one or more of the third party verification servers 119a-c. In accordance with various embodiments, the stateless edge appliance 115, in response to receiving the second set of data, can analyze the received second set of data in the first format, select an intended one or more of the third party networks 117a-c, determine compatible data formats for communication with the selected one or more of the third party networks 117a-c, reformat/transform the received second set of data into the compatible data formats, and route the reformatted second data sets to the third party networks 117a-c.

The third party verification servers 119a-c can, in response to receiving the reformatted second data set, authenticate the second data set and transmit an authentication confirmation to the central server 107. The authentication confirmation, in accordance with various embodiments, can be transmitted by the third party verification servers 119a-c in the compatible data formats via the third party networks 117a-c to the stateless edge appliance 115 which, in turn, reformats the authentication confirmation to the first format to generate a reformatted authentication confirmation for transmission via the first computer network 113 to the central server 107. In response to receiving the reformatted authentication confirmation, the central server 107 can instruct the electronic terminal 101 operated by the user to authenticate the user and proceed with next steps.

Referring now to FIG. 2, by way of non-limiting example, in one application of the technology described herein, a system (e.g., the system 100 of FIG. 1), in accordance with various embodiments, can be used for direct disbursement of a tax refund at a retailer POS (e.g., an electronic terminal 101). FIG. 2 illustrates various exemplary graphical user interfaces of a web service associated with one or more URLs (e.g., URLs 112) hosted by a central server (e.g., central server 107) in a memory (e.g., memory 111) of the central server for rendering and displaying by a display device (e.g., display device 103). Although the example embodiment shown in FIG. 2 illustrates direct disbursement of a tax refund, it will be appreciated in view of this disclosure that, in accordance with various embodiments, the subject patent application can be used for the transfer of any encrypted data.

In use, a user can approach the POS and initiate use of the system. In accordance with various embodiments, the display device can present the user with a first data set graphical user interface 201 requesting a reference number and transaction amount. The reference number can, for example, be a numerical code provided to the user upon completion of a tax return submission. The transaction amount can be, for example, a value of the user's tax refund reflected by the user's tax return submission.

The user, via an input device (e.g., input device 105) can input the requested information (e.g., the first set of data), at which point the POS can verify 203 that the parameters meet a transaction amount limit (e.g., a rule setting a maximum transaction amount permissible for redemption in connection with use of the system). If the transaction amount is over the limit, the system can instruct the display device to render a declination message 211. If the transaction amount is within the limit, the system can transmit 207 the reference number and the transaction amount to one or more third party verification servers (e.g., third party verification servers 119a-c) for validation. Transmission, in accordance with various embodiments can include, for example, transmission of the first set of data through the first computer network 113 to the third party networks 117a-c via the stateless edge appliance 115 as described above with reference to FIG. 1.

The system then receives 207 a validation confirmation from the third party verification servers via the third party networks, the stateless edge appliance, and the first computer network. If the validation is unsuccessful, the system can instruct the display device to render the declination message 211. If the validation is successful, the system 100 can instruct the display device 103 to render a series of second data set graphical user interfaces 213a-f. The series of second data set graphical user interfaces 213a-f can be configured to request, for example, user identifying information (e.g., the second data set) for authenticating the user as being associated with the reference number and transaction amount that were entered in the first data set graphical user interface 201 and subsequently validated 205-207. The POS can also confirm 215 that the aggregate transaction amount is within the transaction amount limit.

Upon receiving user input responding to the requested information associated with the series of second data set graphical user interfaces 213a-f, the system can transmit 217 the second data set to the third party verification servers via the first computer network, the stateless edge appliance, and the third party networks for authentication as described above. The system then receives 219 the authentication confirmation from the third party verification servers via the third party networks, the stateless edge appliance, and the first computer network. If the authentication is unsuccessful, the system can instruct the display device to render a second declination message 223. If the validation is successful, the system can instruct the POS (e.g., the electronic terminal 101) to tender 221 the transaction amount to the user. In accordance with various embodiments, the transaction amount can be tendered by issuance of one or more of currency (e.g., cash), a gift card, a prepaid debit card, or any other suitable payment device.

Figure 3:
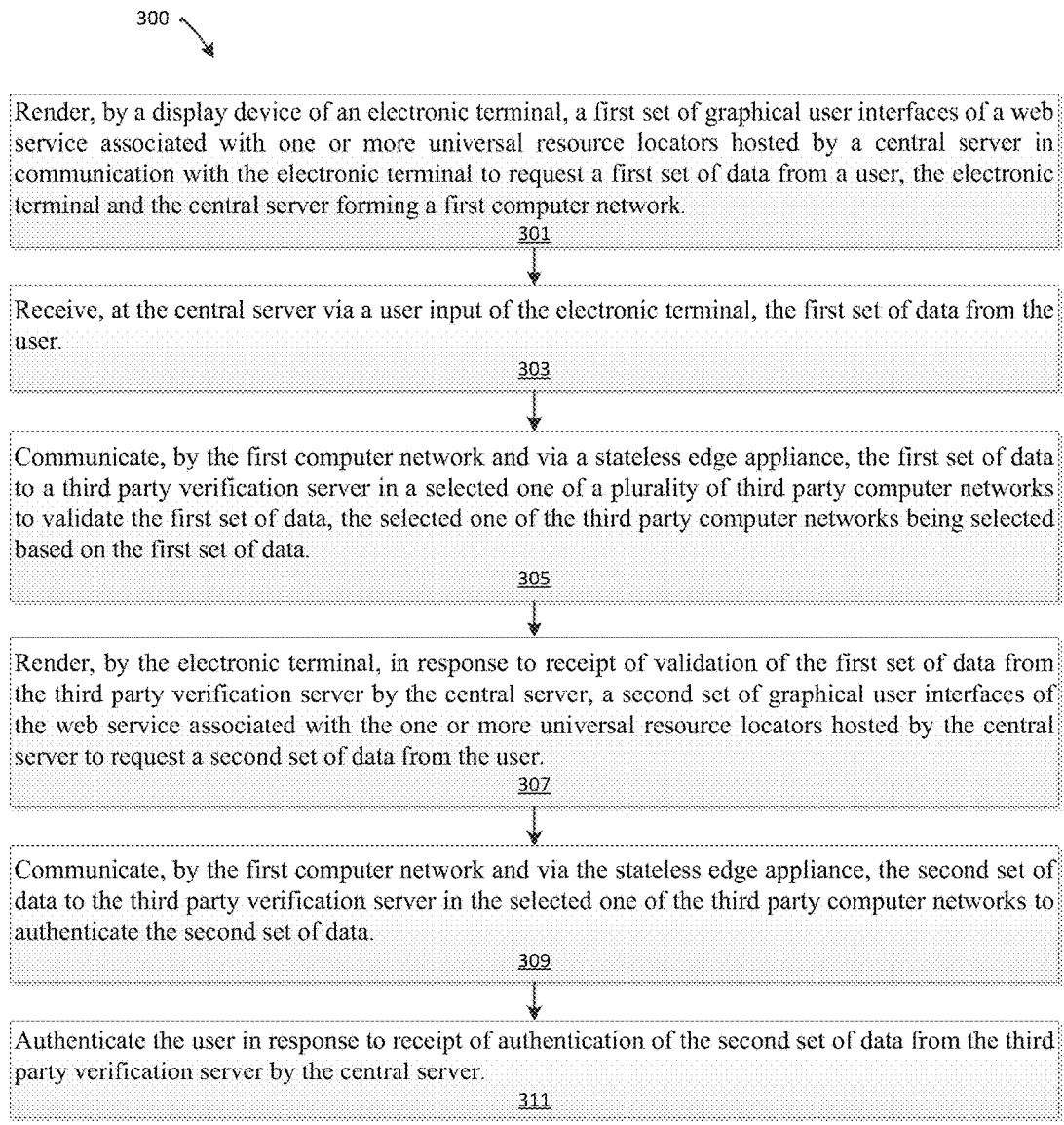
FIG. 3 is a flow diagram illustrating a method for authentication of encrypted data in accordance with various embodiments taught herein.

Referring now to FIG. 3, a method 300 is provided. The method includes a step 301 of rendering, by a display device of an electronic terminal, a first set of graphical user interfaces of a web service associated with one or more universal resource locators hosted by a central server in communication with the electronic terminal to request a first set of data from a user, the electronic terminal and the central server forming a first computer network. The method includes a step 303 of receiving, at the central server via a user input of the electronic terminal, the first set of data from the user. At step 305, the method includes communicating, by the first computer network and via a stateless edge appliance, the first set of data to a third party verification server in a selected one of a plurality of third party computer networks to validate the first set of data, the selected one of the third party computer networks being selected based on the first set of data. At step 307, the method includes rendering, by the electronic terminal, in response to receipt of validation of the first set of data from the third party verification server by the central server, a second set of graphical user interfaces of the web service associated with the one or more universal resource locators hosted by the central server to request a second set of data from the user. At step 309, the method includes communicating, by the first computer network and via the stateless edge appliance, the second set of data to the third party verification server in the selected one of the third party computer networks to authenticate the second set of data. At step 311, the method includes authenticating the user in response to receipt of authentication of the second set of data from the third party verification server by the central server.

The step 301 of rendering, by a display device of an electronic terminal, a first set of graphical user interfaces of a web service associated with one or more universal resource locators hosted by a central server in communication with the electronic terminal to request a first set of data from a user, the electronic terminal and the central server forming a first computer network can be performed, for example but not limited to, using the display device 103 of the electronic terminal(s) 101 as described above with reference to FIG. 1. The step 303 of receiving, at the central server via a user input of the electronic terminal, the first set of data from the user can be performed, for example but not limited to, using the input device 105 of the electronic terminal(s) 101 to receive the first set of data at the electronic terminal as described above with reference to FIG. 1. The step 305 of communicating, by the first computer network and via a stateless edge appliance, the first set of data to a third party verification server in a selected one of a plurality of third party computer networks to validate the first set of data, the selected one of the third party computer networks being selected based on the first set of data can be performed, for example but not limited to, using the communications device 106 of the electronic terminal(s) 101 to transmit the first data set to the central server 107, the communication device 110 of the central server 107 to transmit the first data set to the stateless edge appliance 115 via the first computer network 113, and from the stateless edge appliance 115 to the third party verification servers 119a-c via the third party networks 117a-c as described above with reference to FIG. 1.

The step 307 of rendering, by the electronic terminal, in response to receipt of validation of the first set of data from the third party verification server by the central server, a second set of graphical user interfaces of the web service associated with the one or more universal resource locators hosted by the central server to request a second set of data from the user can be performed, for example but not limited to, by using the display device 103 of the electronic terminal 101 to render the second set of graphical user interfaces in response to the validation confirmation received from the third party verification servers 119a-c as described above with reference to FIG. 1. The step 309 of communicating, by the first computer network and via the stateless edge appliance, the second set of data to the third party verification server in the selected one of the third party computer networks to authenticate the second set of data can be performed, for example but not limited to, using the communications device 106 of the electronic terminal 101 to transmit the second data set to the central server 107, the communication device 110 of the central server 107 to transmit the second data set to the stateless edge appliance 115 via the first computer network 113, and from the stateless edge appliance 115 to the third party verification servers 119a-c via the third party networks 117a-c as described above with reference to FIG. 1. The step 311 of authenticating the user in response to receipt of authentication of the second set of data from the third party verification server by the central server can be performed, for example but not limited to, by authenticating the user in response to the authentication confirmation received from the third party verification servers 119a-c as described above with reference to FIG. 1.

Exemplary Computing Devices

Figure 4:
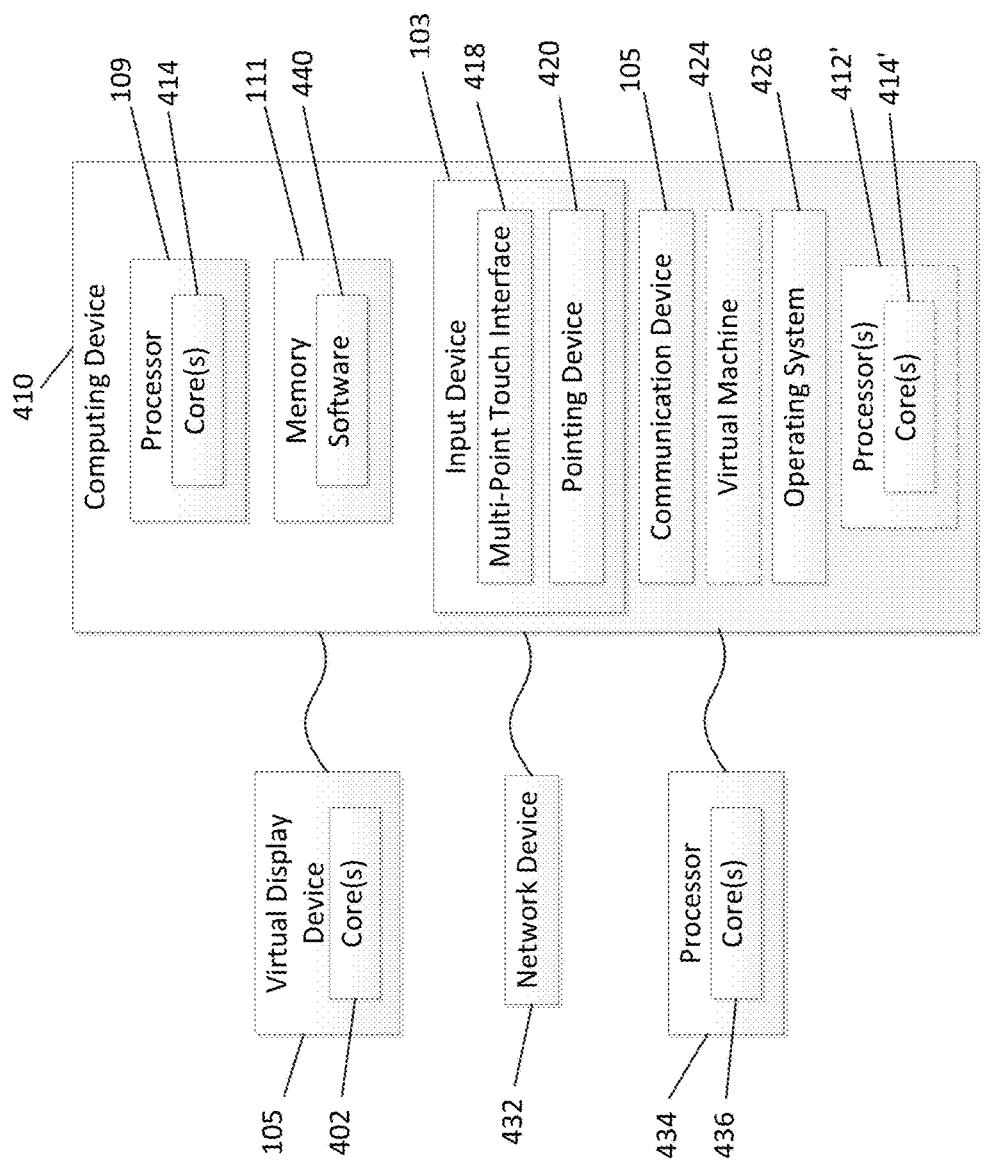
FIG. 4 is an example computational device block diagram depicting various components which can be used to implement various embodiments taught herein.

FIG. 4 is a block diagram of an exemplary computing device 410 such as can be used, or portions thereof, in accordance with various embodiments and, for clarity, refers back to and provides greater detail regarding various elements of the system 100 of FIG. 1. The computing device 410 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 111 included in the computing device 410 can store computer-readable and computer-executable instructions or software for performing the operations disclosed herein. For example, the memory 111 can store a software application 440 which is configured to perform various of the disclosed operations (e.g, using processor 109 to instruct the electronic terminal 101 to render graphical user interfaces and using the communications device 110 to transmit the first data set or the second data set). The computing device 410 can also include configurable and/or programmable processor 109 and an associated core 414, and optionally, one or more additional configurable and/or programmable processing devices, e.g., processor(s) 412' and associated core(s) 414' (for example, in the case of computational devices having multiple processors/cores), for executing computer-readable and computer-executable instructions or software stored in the memory 111 and other programs for controlling system hardware. Processor 109 and processor(s) 412' can each be a single core processor or multiple core (414 and 414') processor.

Virtualization can be employed in the computing device 410 so that infrastructure and resources in the computing device can be shared dynamically. A virtual machine 424 can be provided to handle a process running on multiple processors so that the process appears to be using only one computing resource rather than multiple computing resources. Multiple virtual machines can also be used with one processor.

Memory 111 can include a computational device memory or random access memory, such as DRAM, SRAM, EDO RAM, and the like. Memory 111 can include other types of memory as well, or combinations thereof.

A user can interact with the computing device 410 through a visual display device 428, such as a computer monitor, which can display one or more user interfaces 112 that can be provided in accordance with exemplary embodiments. The computing device 410 can include other I/O devices for receiving input from a user, for example, a keyboard or any suitable multi-point touch interface 418, a pointing device 420 (e.g., a mouse). The keyboard 418 and the pointing device 420 can be coupled to the visual display device 428. The computing device 410 can include other suitable conventional I/O peripherals.

The computing device 410 can also include one or more storage devices 434, such as a hard-drive, CD-ROM, or other computer readable media, for storing data and computer-readable instructions and/or software that perform operations disclosed herein. Exemplary storage device 434 can also store one or more databases for storing any suitable information required to implement exemplary embodiments. The databases can be updated manually or automatically at any suitable time to add, delete, and/or update one or more items in the databases.

The computing device 410 can include a communication device 106, 110 configured to interface via one or more network devices 432 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The communication device 106, 110 can include a built-in network adapter, network interface card, PCMCIA network card, card bus network adapter, wireless network adapter, USB network adapter, modem, radio frequency transceiver, or any other device suitable for interfacing the computing device 410 to any type of network capable of communication and performing the operations described herein. Moreover, the computing device 410 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 410 can run any operating system 426, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 426 can be run in native mode or emulated mode. In an exemplary embodiment, the operating system 426 can be run on one or more cloud machine instances.

Figure 5:
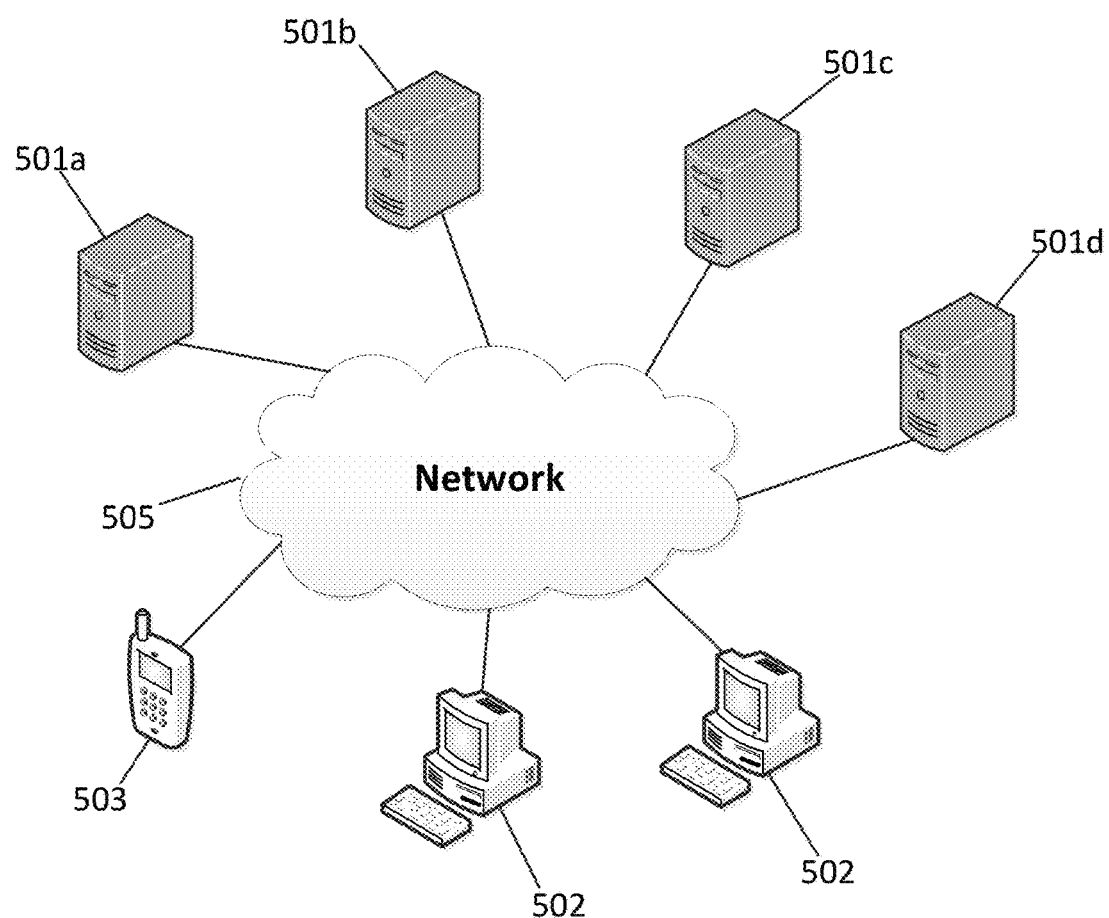
FIG. 5 is an example computational device block diagram depicting various components which can be used to implement various embodiments taught herein in a distributed system.

FIG. 5 is an example computational device block diagram of certain distributed embodiments. Although FIG. 1, and portions of the exemplary discussion above, make reference to centralized systems 100 operating on one or more single computing devices, one will recognize that various of the modules within the system 100 may instead be distributed across a network 505 in separate server systems 501a-d and possibly in user systems, such as a desktop computer device 502, or mobile computer device 503. As one example, users may download an application to their desktop computer device or mobile computer device, which is configured to run the system 100. As another example, the display device 103 can render a client side application of a client-server environment, wherein the system 100 is hosted by a server and interacted with by the desktop computer device or mobile device. In some distributed systems, various modules or components of the system 100 can be separately located on server systems 501a-d and can be in communication with one another across the network 505.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A system comprising:
    a central server;
    a stateless edge appliance; and
    an electronic terminal, the electronic terminal in electrical communication with an input device and a display device, the electronic terminal is configured to render a first set of graphical user interfaces of a web service associated with one or more universal resource locators hosted by a central server to solicit a first set of data from the user including a transaction reference number received from a given one of a plurality of third party computer networks and a transaction amount, the input device configured to receive the first set of data from a user, the first set of data associated with a request;
    wherein the central server is in communication with the electronic terminal, the electronic terminal and the central server forming a first computer network, the first computer network is configured to:
        confirm the first set of data is within a specified maximum amount based on a rule setting of the electronic terminal; and
        in response to confirming the first set of data is within the specified threshold, communicate, by the first computer network, the first set of data to the stateless edge appliance;
    wherein the stateless edge appliance is in electronic communication with the first computer network and the plurality of third party computer networks, the stateless edge appliance configured to (i) receive the first set of data in a first format for communication from the first computer network, (ii) select the given one of the plurality of third party computer networks based at least on the transaction reference number in the first set of data, (iii) determine a compatible data format for communication with the given one of the plurality of third party computer networks that has been selected, (iii) reformat the received first set of data from the first format to the compatible data format, and (iv) route the reformatted first set of data to a third party verification server in the given one of the plurality of third party computer networks that has been selected, to validate the first set of data;
    wherein, in response to receipt of validation of the first set of data from the third party verification server by the central server, the electronic terminal is configured to render a second set of graphical user interfaces of the web service associated with the one or more universal resource locators hosted by the central server to solicit a second set of data from the user to authenticate the user;
    wherein the stateless edge appliance is configured to receive the second set of data in the first format for communication from the first computer network and reformat the received second set of data from the first format to the compatible data format;
    wherein the central server is configured to communicate, by the first computer network and via the stateless edge appliance, the reformatted second set of data to the third party verification server in the given one of the plurality of third party computer networks that has been selected to authenticate the reformatted second set of data, and receive an authentication confirmation in the first format from the third party verification server, via the stateless edge appliance, the authentication confirmation reformatted from the compatible data format associated with the given one of the plurality of third party computer networks that has been selected to the first format by the stateless edge appliance; and
    wherein the electronic terminal is configured to authenticate the user in response to receipt of the authentication confirmation of the second set of data from the third party verification server by the central server, process the request received from the first set of graphical user interfaces based on the validation of the first set of data and the authentication of the user based on the second set of data, and tender payment to the user for a monetary value associated with the transaction amount in response to the authentication of the user by the electronic terminal.

2. The system of claim 1, wherein the central server is hosted on a cloud.

3. The system of claim 1, wherein the sets of data in the first format are encrypted according to a first encryption standard.

4. The system of claim 3, wherein sets of data in the compatible data formats are encrypted according to a different encryption standard.

5. The system of claim 1, wherein the electronic terminal is at least one of an automated teller machine or a point of sale terminal.

6. A method comprising:
    rendering, by a display device of an electronic terminal, a first set of graphical user interfaces of a web service associated with one or more universal resource locators hosted by a central server in communication with the electronic terminal to solicit a first set of data from a user, the electronic terminal and the central server forming a first computer network, the first set of data associated with a request;
    receiving, at the central server via a user input of the electronic terminal, the first set of data from the user including a transaction reference number received from a given one of a plurality of third party computer networks and a transaction amount;
    confirming, at the central server, the first set of data is within a specified maximum amount based on a rule setting of the electronic terminal;
    in response to confirming the first set of data is within the specified maximum amount, communicating, via the first computer network, the first set of data to a stateless edge appliance;
    receiving, via the stateless edge appliance in electronic communication with the plurality of third party computer networks, the first set of data in a first format for communication from the central server;
    selecting, via the stateless edge appliance, the given one of the plurality of third party computer networks based at least on the transaction reference number in the first set of data;

determining, via the stateless edge appliance, a compatible data format for communication with the given one of the plurality of third party computer networks that has been selected;
reformatting, via the stateless edge appliance, the received the first set of data from the first format to the compatible data format;
routing, via the stateless edge appliance, the reformatted the first set of data to a third party verification server in the given one of the plurality of third party computer networks that has been selected, to validate the first set of data;
rendering, by the electronic terminal, in response to receipt of validation of the first set of data from the third party verification server by the central server, a second set of graphical user interfaces of the web service associated with the one or more universal resource locators hosted by the central server to solicit a second set of data from the user to authenticate the user;
receiving, via the stateless edge appliance, the second set of data in the first format for communication from the first computer network;
reformatting, via the stateless edge appliance, the received the second set of data from the first format to the compatible data format associated with the given one of the plurality of third party computer networks that has been selected;
communicating, by the first computer network and via the stateless edge appliance, the reformatted second set of data to the third party verification server in the given one of the plurality of third party computer networks that has been selected to authenticate the reformatted second set of data;
receiving, via the central server, an authentication confirmation in the first format from the third party verification server, routed from the stateless edge appliance, the authentication confirmation reformatted from the compatible data formats associated with the given one of the third party computer networks that has been selected to the first format by the stateless edge appliance;
authenticating the user in response to receipt of the authentication confirmation of the second set of data from the third party verification server by the central server;
processing, via the electronic terminal, the request received from the first set of graphical user interfaces based on the validation of the first set of data and the authentication of the user based on the second set of data; and
tendering, via the electronic terminal, payment to the user for a monetary value associated with the transaction amount in response to the authentication of the user by the electronic terminal.

7. The method of claim 6, wherein the central server is hosted on a cloud.

8. The method of claim 6, wherein the sets of data in the first format are encrypted according to a first encryption standard.

9. The method of claim 8, wherein sets of data in the compatible data formats are encrypted according to a different encryption standard.

10. The method of claim 6, wherein the electronic terminal is at least one of an automated teller machine or a point of sale terminal.

11. A non-transitory computer readable medium including instructions that, when executed by a processor of a central server, cause the central server to:
instruct an electronic terminal in communication with the central server to render, by a display device of the electronic terminal, a first set of graphical user interfaces of a web service associated with one or more universal resource locators hosted by the central server to solicit a first set of data from a user, the electronic terminal and the central server forming a first computer network, the first set of data associated with a request;
receive, at the central server via a user input of the electronic terminal, the first set of data from the user including a transaction reference number received from a given one of a plurality of third party computer networks and a transaction amount;
confirm, at the first computer network, the first set of data is within a specified maximum amount based on a rule setting of the electronic terminal;
in response to confirming the first set of data is within the specified maximum amount, communicate, via the first computer network, the first set of data to a stateless edge appliance;
receive, via the stateless edge appliance in electronic communication with the plurality of third party computer networks, the first set of data in a first format for communication from the central server;
select, via the stateless edge appliance, the given one of the plurality of third party computer networks based at least on the transaction reference number of the first set of data;
determine, via the stateless edge appliance, a compatible data format for communication with the given one of the plurality of third party computer networks that has been selected;
reformat, via the stateless edge appliance, the received first set of data from the first format to the compatible data format;
route, via the stateless edge appliance, the reformatted first set of data to a third party verification server in the given one of the plurality of third party computer networks that has been selected, to validate the first set of data;
instruct an electronic terminal to render, in response to receipt of validation of the first set of data from the third party verification server by the central server, a second set of graphical user interfaces of the web service associated with the one or more universal resource locators hosted by the central server to solicit a second set of data from the user to authenticate the user;
receive, via the stateless edge appliance, the second set of data in the first format for communication from the first computer network;
reformat, via the stateless edge appliance, the received the second set of data from the first format to the compatible data format associated with the given one of the plurality of third party computer networks that has been selected;
communicate, by the first computer network and via the stateless edge appliance, the reformatted second set of data to the third party verification server in the given one of the plurality of third party computer networks that has been selected to authenticate the reformatted second set of data;
receive, via the first computer network, an authentication confirmation in the first format from the third party verification server, routed from the stateless edge appliance, the authentication confirmation reformatted from the compatible data formats associated with the given one of the plurality of third party computer networks that has been selected to the first format by the stateless edge appliance;

instruct the electronic terminal to authenticate the user in response to receipt of the authentication confirmation of the second set of data from the third party verification server by the central server;

process, via the electronic terminal, the request received from the first set of graphical user interfaces based on the validation of the first set of data and the authentication of the user based on the second set of data; and tender payment to the user for a monetary value associated with the transaction amount in response to the authentication of the user by the electronic terminal.

12. The non-transitory computer readable medium of claim 11, wherein the sets of data in the first format are encrypted according to a first encryption standard.

13. The non-transitory computer readable medium of claim 12, wherein sets of data in the compatible data formats are encrypted according to a different encryption standard.

* * * * *